United States Patent [19]

Bernard et al.

[11] 4,192,742
[45] Mar. 11, 1980

[54] PROCESS AND APPARATUS FOR THE BIOLOGICAL TREATMENT OF WASTE WATER

[75] Inventors: Jacques Bernard, Saint-Germain-en-Laye; Jean Bebin; Jean-Pierre Hazard, both of Rueil-Malmaison, all of France

[73] Assignee: Degremont S.A., Rueil-Malmaison, France

[21] Appl. No.: 901,259

[22] Filed: Apr. 28, 1978

[30] Foreign Application Priority Data

May 10, 1977 [FR] France .................................. 77 14196

[51] Int. Cl.$^2$ .................................................. C02C 5/10
[52] U.S. Cl. .................................... 210/17; 210/90; 210/104; 210/150
[58] Field of Search .................. 210/15, 17, 63 R, 86, 210/90, 96 R, 104, 103, 150, 151, 198 R, 202, 203, 220

[56] References Cited

U.S. PATENT DOCUMENTS

| | | | |
|---|---|---|---|
| 3,731,522 | 5/1973 | Mikesell | 210/96 R |
| 3,928,190 | 12/1975 | Bebin | 210/17 |
| 3,933,629 | 1/1976 | Smith | 210/17 |
| 3,968,035 | 7/1976 | Howe | 210/63 R |

*Primary Examiner*—Benoît Castel
*Attorney, Agent, or Firm*—Wenderoth, Lind & Ponack

[57] ABSTRACT

Waste water to be treated is introduced into an enclosed gas tight oxygenation chamber. An oxygen-containing gas is also introduced into the oxygenation chamber, at a pressure higher than atmospheric pressure, such that oxygen from the gas is dissolved in the waste water in a quantity higher than the saturation concentration value of oxygen in the waste water at atmospheric pressure, thereby superoxygenating the waste water. The thus superoxygenated waste water, maintained at such pressure higher than atmospheric pressure, is then passed into an enclosed gas tight filtering chamber which is separate from the oxygenation chamber and which is also maintained at such pressure higher than atmospheric pressure. No other oxygen, other than the oxygen dissolved in the waste water, is introduced into the interior of the filtering chamber. The superoxygenated waste water is passed through a biological filter bed within the oxygenation chamber, thereby biologically purifying the waste water to form purified water which is then removed from the filtering chamber.

10 Claims, 2 Drawing Figures

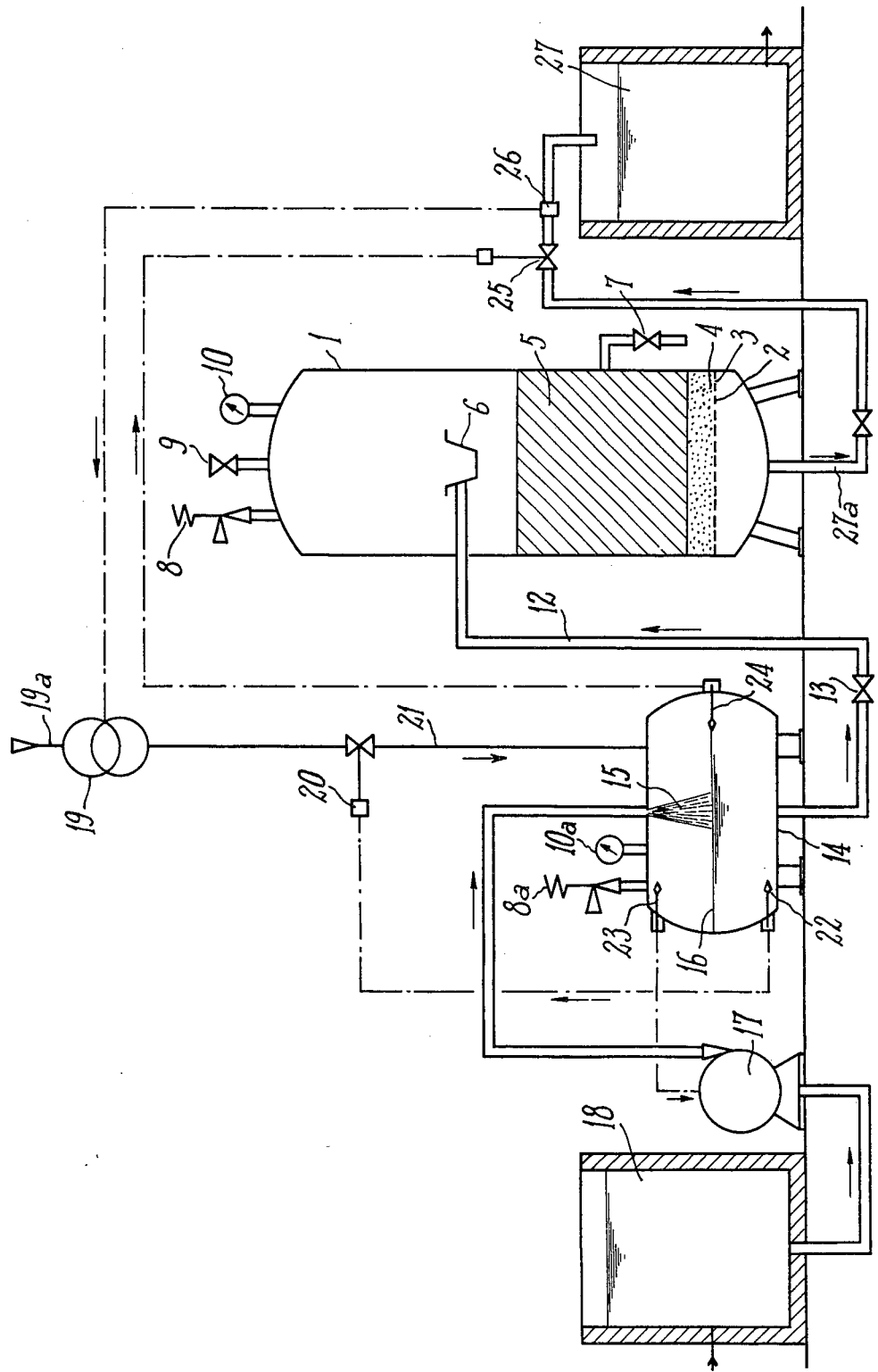

PROCESS AND APPARATUS FOR THE BIOLOGICAL TREATMENT OF WASTE WATER

BACKGROUND OF THE INVENTION

The present invention relates to an improved biological filter system and to a process and apparatus for the biological treatment of waste water.

It is known to decompose by bacteriological action organic materials which are dissolved in a waste water, by passing the waste water through a biological filter bed.

U.S. Pat. No. 3,928,190 discloses a biological filtering treatment system wherein a biological filter bed is formed of a granular material, such as baked clay, for example fire clay, having a grain size of from 0.5 to 4.0 mm, preferably approximately 2.0 mm, with the granular material having on the surfaces thereof hollow zones capable of supporting a bacterial film and retaining such bacterial film even when the filter bed is subjected to severe backwashing and smooth zones capable of supporting a bacterial film but permitting removal of such bacterial film during backwashing. This filter bed is used in an aerobiosis system for the biological purification of waste water, wherein the water entering the filter bed has dissolved therein oxygen in quantities as close to the saturation level as possible. This is done through preliminary aeration of the waste water, just prior to passage through the filter bed, by means of a diffusion device. By the use of this prior system, and by diffusing air into the waste water, it is possible to achieve dissolved oxygen concentrations of from approximately 7 to 8 mg/l. These values may be increased to approximately 25 to 30 mg/l by injecting pure oxygen or oxygen enriched air, rather than normal air, into the waste water.

It has been observed that when purifying waste water under the conditions set forth in U.S. Pat. No. 3,928,190, there is required only a relatively low amount of oxygen to remove the pollutants from the waste water, the degree of pollution in the waste water conventionally being expressed in terms of biochemical oxygen demand ($BOD_5$), which is the quantity of oxygen in milligrams per liter utilized in the biological oxidation of the organic matter contained in the waste water within a period of five days at 20° C. Thus, it is readily determined that the elimination of pollution in the amount of 1 mg of $BOD_5$ requires only that approximately 0.5 to 0.7 mg oxygen be dissolved in the waste water prior to its passage through the biological filter. Thus, by preliminary aeration of the waste water with air before passage of the waste water through the filter of U.S. Pat. No. 3,928,190, it is possible to eliminate approximately 10 to 16 mg $BOD_5$ per liter of filtered water. The amount of eliminated pollution can be raised to approximately 40 to 50 mg/l when the water waste is preliminarily aerated with pure oxygen.

However, when urban or industrial waste water to be treated is subjected to a preliminary purification involving the addition of flocculating reagents and then the separation of the flocculated products, or when it is desired to directly purify an industrial waste water which is only slightly polluted as compared with normal industrial waste water, it might be expected that the amount of pollution dissolved in the waste water at the inlet of the filter might easily attain or even exceed 100 mg/l of $BOD_5$. If this higher amount of initial pollution is to be reduced to a level of approximately 30 mg/l by use of the biological filter system of U.S. Pat. No. 3,928,190, then the amount of oxygen which can be dissolved into the waste water is insufficient to achieve such degree of purification. In U.S. Pat. No. 3,928,190, this deficiency in dissolved oxygen content is at least partially relieved by recycling a portion of the filtered water upstream of the aeration device, to thereby increase the amount of available oxygen. However, when this recycling operation is necessary, then the overall filtering production rate is limited to a value of approximately 8 to 13 $m^3/m^2/h$. Therefore, to avoid a loss in production efficiency, it is oftentimes necessary to increase the dimensions of the filter. It will accordingly be apparent that the amount of pollution which can be eliminated per unit volume of the filter bed is limited. For example, for a filter bed height of between 1.5 and 2.0 meters, the amount of pollution which can be eliminated per unit of volume of the filter bed is approximately 2 kg of $BOD_5$ per cubic meter of filter bed per day when the preliminary aeration is achieved with normal air, and approximately 4 to 5 kg of $BOD_5$ per cubic meter of filter bed per day when the preliminary aeration is achieved by pure oxygen or oxygen enriched air.

A further biological filter system for the purification of waste water is shown in U.S. Pat. No. 4,053,396, wherein there is employed an activated carbon filter bed, wherein the waste water has dissolved therein oxygen in an amount in the range of from 0.09 to about 0.15 pound of oxygen consumed per pound of total COD (chemical oxygen demand) of contaminants removed from the waste water. The oxygen is added to the waste water in the head space of each filter bed, but the last filter bed of a plurality of serially connected filter beds. However, in the system of U.S. Pat. No. 4,053,396, the control of the amount of oxygen dissolved in the waste water is achieved by plural flow rates of oxygen added at different stages of the system. Such prior art system is however complicated to control and regulate, particularly when the level of pollution in the waste water supplied to the system continually varies, as is conventional.

SUMMARY OF THE INVENTION

With the above discussion in mind, it is a primary object of the present invention to provide an improved biological filtering system and an improved process and apparatus for the biological treatment of waste water wherein it is possible to increase the performance of the biological filter both with regard to the amount of $BOD_5$ eliminated per liter of treated water, and also with regard to the amount of $BOD_5$ eliminated per cubic meter of filtering material.

It is a further object of the present invention to provide such a process and apparatus whereby it is possible to eliminate the need for recycling purified water, while still improving and providing a satisfactory level of the filtering rate and efficiency.

It is a further object of the present invention to provide such a process and apparatus whereby it is possible to simply and accurately regulate the amount of oxygen dissolved in the waste water, through a variation of pressure in the system, rather than through a variation of the flow rate of the water through the filter.

It is a still further object of the present invention to provide such a process and apparatus which maximizes the efficient use of oxygen by automatically ensuring that more oxygen is dissolved in the waste water when the proportion of pollutants thereof increases, and by automatically ensuring that the amount of oxygen dissolved in the waste water is decreased when the level of pollutants in the waste waste decreases.

With the above discussion in mind, the above objects are achieved in accordance with the present invention by the provision of an immersed biological filter bed of the type disclosed in U.S. Pat. No. 3,928,190 (the disclosure of which is herein incorporated by reference), and a completely enclosed, gas tight filtering chamber, with the biological filter bed being enclosed within the interior of the filtering chamber at a pressure above atmospheric pressure. Waste water to be treated is previously superoxygenated at the pressure which is maintained within the filtering chamber and is then supplied at such pressure to the interior of the filtering chamber, whereafter the superoxygenated waste water passes through the biological filter bed and is thereby purified to form purified water.

The waste water is superoxygenated in an enclosed gas tight oxygenation chamber which is separate from the filtering chamber. Specifically, waste water to be treated is introduced into the interior of the oxygenation chamber. Further, an oxygen-containing gas is also introduced into the oxygenation chamber at a pressure equal to the pressure maintained in the filtering chamber, such pressure being higher than atmospheric pressure. Thus, oxygen from the oxygen-containing gas is dissolved in the waste water within the oxygenation chamber in a quantity higher than the saturation concentration value of oxygen in the waste water at atmospheric pressure. Thus, the waste water is superoxygenated.

The superoxygenated waste water is passed from the separate oxygenation chamber into the separate filtering chamber. Since the two separate chambers are maintained at the same pressure higher than atmospheric pressure, there will be no change in the pressure of the superoxygenated waste water. Since the filtering chamber is enclosed and air tight, and since air or other oxygen-containing gas is not introduced directly into the interior of the filtering chamber, there will be no release of the oxygen dissolved in the waste water before the waste water passes through the biological filter.

Therefore, it will be apparent that when the waste water is actually biologically purified during passage through the biological filter bed, the waste water will have dissolved therein substantially more oxygen than in prior art devices. This will make it possible to eliminate greater amounts of pollutants dissolved in the waste water.

In fact, if the pressure within the filtering chamber were not maintained at the higher level of the pressure maintained within the interior of the oxygenation chamber, then upon passage of the waste water into the interior of the filtering chamber, some of the oxygen dissolved in the waste water would be released, thereby running the risk of producing turbulence in the filter bed. This would not only increase the consumption of oxygen necessary to remove pollutants from the waste water, but would also reduce the efficiency of the filter bed as a physical filter to hold back or retain residual solid particles suspended in the waste water. Such disadvantages are avoided in accordance with the present invention by maintaining the interior of the filter chamber at the same pressure higher than atmospheric pressure that is maintained in the interior of the oxygenation chamber. The waste water to be treated is continuously oxygenated within the oxygenation chamber at a pressure higher than atmospheric pressure. The oxygen-containing gas is introduced into the gaseous atmosphere above the level of the waste water in the upper portion of the oxygenation chamber. Such gas may be introduced directly into such upper portion of the oxygenation chamber, or may be passed through the waste water. It is to be understood that as employed in this description and in the appended claims the term "oxygen-containing gas" is intended to refer to air, oxygen enriched air, or pure oxygen. It will be readily apparent to those skilled in the art that all of these gases may be employed, dependent upon the particular requirements of a given installation treating a given waste water of a given degree of pollution. It will however further be understood by those skilled in the art that pure oxygen or oxygen enriched air having a high concentration of oxygen will result in higher levels or concentrations of oxygen dissolved in the pressurized waste water. The waste water to be treated may be injected into the interior of the oxygenation chamber by a pump or similar means. It will be apparent that the residence time of the water to be treated within the interior of the oxygenation chamber will vary from installation to installation, dependent upon the desired maximum rate of feed, the maximum pressure of operation, and the desired concentration of oxygen to be dissolved in the waste water. It would generally be expected however that the residence time of the waste water within the oxygenation chamber would be from approximately one minute to a few minutes. This residence time would also of course vary depending upon the efficiency of the particular manner employed to dissolve the oxygen in the waste water. It is believed that one of ordinary skill in the art, upon considering the present disclosure, would readily be able to design a system which would achieve the obvious intended results disclosed herein by employing otherwise known principles and techniques.

The waste water, superoxygenated to a desired and necessary degree, is transferred from the interior of the oxygenation chamber to the interior of the filtering chamber, preferably into the upper portion thereof such that the waste water passes downwardly through a filter bed of the type disclosed in U.S. Pat. No. 3,928,190. Alternatively, a single oxygenation chamber could be employed to supply in parallel plural filtering chambers. Additionally, due to the fact that the interior of the filtering chamber is maintained at the same high pressure as the interior of the oxygenation chamber, it would be possible in accordance with the present invention to introduce the superoxygenated waste water directly into the filter bed.

In accordance with the present invention, for a given installation which is desired to be fed at a fixed rate, it is possible to vary the amount of oxygen dissolved into the waste water to be treated, by varying the pressure prevailing in the oxygenation chamber and in the filtering chamber. Therefore, when the pollution content of the waste water being treated varies, it is possible to maximize the efficient use of oxygen to alter the amount of oxygen dissolved in the waste water as needed, by varying the internal pressure of the system.

More particularly, in accordance with a preferred arrangement of the present invention, the residual dissolved oxygen content of the purified water is continuously measured, and the measured value is compared with at least one predetermined reference value, preferably a predetermined maximum reference value and a predetermined minimum reference value. Variation of the measured value from the predetermined reference value or values is used to control the pressure within the system, and therefore the amount of oxygen dissolved in the waste water within the oxygenation chamber.

More particularly, if the measured value of the residual dissolved oxygen content of the purified water exceeds a predetermined maximum reference value, due to the fact that the level of pollution in the waste water, i.e. the $BOD_5$, has become lower, then less oxygen need be dissolved in the waste water, and this reduction in dissolved oxygen can be achieved by reducing the pressure within the oxygenation chamber. Inversely, if the measured value of the residual dissolved oxygen content of the purified water drops below a predetermined minimum reference value, this means that the amount of pollution in the waste water has increased, i.e. that the $BOD_5$ has increased. Therefore, it becomes necessary to dissolve a greater amount of oxygen in the waste water within the oxygenation chamber, and this can be done by increasing the pressure within the system. This discussion is of course based upon other parameters, such as temperature, being equal.

BRIEF DESCRIPTION OF THE DRAWINGS

The above and other objects, features and advantages of the present invention will be apparent from the following description, taken with the accompanying drawings, wherein:

FIG. 1 is a schematic flowchart illustrating the operation of the process and system for the biological treatment of waste water in accordance with the present invention; and FIG. 2 is a schematic illustration of a modification of the arrangement shown in FIG. 1.

DETAILED DESCRIPTION OF THE INVENTION

FIG. 1 schematically shows one embodiment of a system for the biological treatment of waste water in accordance with the present invention. The system includes an enclosed air tight filtering tank or chamber 1. It is of course to be understood that the present invention may include a plurality of filtering chambers connected in series. It is even further to be understood that the present invention could include plural groups of serially connected filtering chambers, with the first or inlet filtering chambers of each such group being connected in parallel.

Within the interior of each such filtering chamber 1 there is provided a biological filter bed 5, preferably of the type disclosed in U.S. Pat. No. 3,928,190. The height or depth of biological filter bed 5 is preferably between approximately 0.5 m and 4.0 m, and is further advantageously between approximately 2.0 and 3.0 m to achieve a filtering rate of 10 to 20 $m^3/m^2/h$ of water initially containing approximately 30 to 50 mg/l of dissolved oxygen. It is however to be understood that these parameters are not intended to be limiting to the scope of the present invention. Rather, these parameters are intended to be exemplary of specific embodiments only, and it will be apparent to those skilled in the art that other, varying parameters may be employed as necessary within the scope of the present invention.

Biological filter bed 5 may be supported on a layer 4 of granular material or materials, such materials being capable of additional water treatments, for example physical filtering treatments. Layer 4 may be supported on a bottom structure 2 which may be a double layer bottom structure equipped with bushings 3 or which may be a perforate plate.

The filtering chamber 1 is equipped with conventional safety and control accessories, for example such as a sampling device 7, or a plurality of such devices, a safety valve 8, a gas blow-off device 9, and a manometer 10.

Waste water to be biologically filtered, which has previously been superoxygenated in a manner to be discussed hereinbelow, passes through a pipe 12, having a shut-off valve 13 therein, and is introduced into the interior of filtering chamber 1 by means of a basin or trough-type device 6, the purpose of which is to distribute the superoxygenated waste water above the material of the biological filter bed 5.

The waste water, having dissolved therein a desired content of oxygen, then passes downwardly through biological filtering bed 5, whereby the water is biologically purified by the removal therefrom of organic pollutants in a manner which is known. The thus purified water may then pass downwardly through layer or layers 4 which may be for the purpose of further treating the water, for example imparting a physical filtering treatment thereto. As indicated above, the scope of the present invention may include plural biological filters connected in series, such that the water to be treated passes seriatim through such plural serially connected biological filters.

The purified water passes outwardly of filtering chamber 1 through outlet pipe or conduit 27a and is collected, for example in a tank 27.

The installation of the present invention further includes means, separate from filtering chamber 1, for superoxygenating the waste water to be treated, prior to passage of such waste water into the interior of filtering chamber 1. Such means includes an enclosed gas tight oxygenation chamber 14, the interior of which is separate from the interior of filtering chamber 1. It is however intended to be within the scope of the present invention that the oxygenation chamber could be physically positioned within the interior of the filtering chamber, for example above the biological filter bed 5, such as shown in FIG. 2 wherein oxygenation chamber 14a is within filtering chamber 1a. However, even in such an arrangement, the interior of oxygenation chamber 14a is isolated from the interior of filtering chamber 1a.

Waste water to be treated is supplied, for example from tank 18, into the interior of chamber 14 by means of a pump 17, or a plurality of such pumps. Pressurized oxygen-containing gas is supplied from a gas supply duct 19a through a pipe 21 or 21a into the interior of chamber 14 or 14a. Chamber 14 is supplied with conventional safety and control devices, such as safety valve 8a and manometer 10a.

The gas which is supplied into the interior of chamber 14 is pressurized, and this pressure is maintained throughout the chamber 14, pipe 12 and chamber 1 by means of regulating valve 25 which is provided in outlet duct 27a of chamber 1. That is, regulating valve 25 acts to maintain a back pressure throughout the system, and the pressure is always maintained at a pressure above atmospheric pressure. The specific pressure involved for a given installation will however, as will be understood by those skilled in the art, vary dependent upon the type of oxygen-containing gas employed and upon the amount of oxygen which must be dissolved in a given quality of waste water to achieve a given plurality of purified water.

FIG. 1 illustrates that the oxygen is dissolved in the waste water by forming a jet 15 of the waste water which is directed downwardly onto the surface 16 of the waste water phase within the chamber 14, thereby creating turbulence. It will be apparent to those skilled in the art that such turbulence, as well as the spray configuration of the jet 15, will result in oxygen being dissolved in the waste water.

It is however to be understood that any known system for dissolving oxygen in the waste water is intended to be encompassed within the scope of the present invention. That is, there may be effected a separation of the gas in the waste water by producing bubbles in the waste water, for example such as produced by jet 15 striking surface 16, by mechanical agitation of the water, by diffusion of the gas in the water through a porous material, or by introducing the gas directly into the waste water. Also, dissolution of the oxygen in the waste water may be achieved by separation of the water in the gas, for example by spraying of the water into a gaseous atmosphere within the chamber, a breaking down of the water jet, for example by baffles, dripping the water through the gaseous atmosphere within chamber 14, or by mechanical agitation of the water.

It is to be understood that the scope of the present invention is intended to encompass arrangements whereby plural filtering chambers 1 could be supplied in parallel from a single oxygenation chamber 14.

For a given water treatment operation, the pressure of the gas supplied to chamber 14 is maintained at a level such that, in conjunction with regulating valve 25, the pressure within chamber 14 will be at a level above atmospheric pressure to achieve superoxygenation of the waste water. That is, the pressure will be maintained such that oxygen from the gas is dissolved in the waste water in a quantity higher than the saturation concentration value of oxygen in the waste water at atmospheric pressure. Such pressure will be the same throughout the interior of chamber 14, pipe 12, and the interior of chamber 1. It will be apparent to those skilled in the art that the actual pressure within chamber 14 required to achieve a desired degree of oxygen dissolution will depend upon the type of oxygen-containing gas employed. That is, the pressure required to achieve a given level of oxygen dissolution, all other parameters being equal, will be less when employing oxygen enriched air than when employing ordinary air, and will be even further less when employing pure oxygen. Thus, the system of the present invention offers great flexibility in treating waste waters containing varying degrees of pollutants. That is, when the flow rate through the system is maintained constant, but the level of pollutants in the water is increased, the quality of purified water may be maintained constant by increasing the pressure within chamber 14, and thereby increasing the amount of oxygen dissolved in the waste water. Alternatively, the amount of oxygen dissolved in the waste water can be increased from changing from normal air to oxygen enriched air, or from oxygen enriched air to pure oxygen. In all cases however, the pressure within chamber 14 is maintained at a level higher than atmospheric or ambient pressure. Further, when the degree of pollution within the waste water remains constant, but when it is desired to increase the rate of flow through the installation while maintaining the same quality of purified water, it is then necessary to dissolve more oxygen in the waste water, and this can be achieved by increasing the pressure within chamber 14 and/or by employing a gas containing a higher concentration of oxygen.

A liquid level detector 22 is positioned to determine when the level 16 of the waste water within chamber 14 reaches a predetermined minimum level. When such level is detected by detector 22, then a regulating valve 20 is operated to reduce or stop the supply of gas through pipe 21 into chamber 14. Therefore, the level of waste water within chamber 14 will rise, whereby regulating valve 20 will be opened and the supply of gas to chamber 14 will be resumed. Similarly, another liquid level detector 23 is positioned to detect when a maximum predetermined waste water level is achieved. When such maximum waste water level is detected, then detector 23 operates on pump or pumps 17 to reduce or stop the supply of waste water to chamber 14. Thereafter, the level of waste water will drop, and detector 23 will again operate pump or pumps 17 to resume the supply of waste water. It will of course be apparent that detectors 22 and 23, when located within the interior of chamber 14, must be positioned in non-turbulent areas thereof.

In accordance with a further preferred feature of the present invention, it is possible to regulate the pressure of the system, and thus the amount of oxygen dissolved in the waste water, as a function of changing levels of pollutant in the waste water to be treated, such regulation being automatic.

More particularly, an oxygen analyzer 26, of known and conventional construction is positioned to measure the residual dissolved oxygen content of the purified water passing through outlet duct 27a. It is to be understood that analyzer 26 could equally be associated with sampling device or devices 7. At any rate, oxygen analyzer 26 controls the operation of pressure regulator 19 which regulates the amount of oxygen-containing gas supplied through pipe 21 into the interior of chamber 14. A liquid level detector 24 detects variations in the level 16 of the waste water within chamber 14. Liquid level detector 24 controls the operation of regulating valve 25. By the operation of these elements, it is possible to automatically maximize the efficient use of oxygen, as a function of variation in pollutant content of the waste water to be treated.

More specifically, if oxygen analyzer 26 detects that the purified water has a residual dissolved oxygen content of more than a predetermined reference value, for example 2 mg/l, then oxygen analyzer 26 will cause pressure regulator 19 to allow less oxygen-containing gas to be passed through pipe 21 into chamber 14. When this occurs, the level 16 of the waste water within chamber 14 will rise. Such level rise will be detected by liquid level detector 24, which will then cause a slight further opening of regulating valve 25. This will result in a reduction in pressure in the overall system, i.e. in chamber 1, pipe 12, and chamber 14. Therefore, less oxygen will be dissolved in the waste water. Such control ensures that excess oxygen, i.e. more oxygen than is required to eliminate the pollutant level of the waste water, is not unnecessarily consumed.

It will be apparent that the above discussed control system works in precisely the opposite manner when the level of pollutants in the waste water increases. That is, when oxygen analyzer 26 detects a residual dissolved oxygen content in the purified water of less than a predetermined minimum reference value, for example 1 mg/l, then oxygen analyzer 26 will cause pressure regulator 19 to allow a greater quantity of oxygen-containing gas to pass through pipe 21 into the interior of chamber 14. This will result in the level 16 of the waste water filter bed 5 was constructed in accordance with the disclosure of U.S. Pat. No. 3,928,190 and had a surface area of 0.125 m² and a height or depth of 1.8 m. Thus, the total volume of the biological filter bed 5 was 0.225 m³.

| Water Flow Rate (m³/h) | Filtering Speed (m³/m²/h) | Dissolved Oxygen in Front of Filter (mg/l) | $BOD_5$ in Front of Filter (mg/l) | $BOD_5$ After Filter (mg/l) | $BOD_5$ Eliminated (mg/l) | $BOD_5$ Eliminated (kg per m³/day) | Dissolved Oxygen After Filter (mg/l) | mg of Oxygen Used per mg $BOD_5$ Eliminated | Matter in Suspension in Filtered Water (mg/l) |
|---|---|---|---|---|---|---|---|---|---|
| 1.625 | 13 | 36 | 83 | 23 | 60 | 10.38 | 2 | 0.56 | 4 |
| 1.625 | 13 | 33 | 74 | 34 | 40 | 6.92 | 2.5 | 0.76 | 8.5 |
| 1.875 | 15 | 32 | 104 | 42 | 62 | 12.40 | 4 | 0.45 | 9.5 |
| 1.875 | 15 | 33 | 92 | 33 | 59 | 11.80 | 6 | 0.45 | 9.5 | dropping, and this level drop will be detected by liquid level detector 24, which will then cause regulating valve 25 to slightly close. This will result in the pressure in the overall installation increasing, with the result that thereafter a greater quantity of oxygen will be dissolved in the waste water. This will ensure that the waste water which passes through the biological filter bed 5 contains enough dissolved oxygen to achieve the desired level of biological purification.

It is believed to be apparent from the above discussion that in accordance with the concepts of the present invention it is possible to achieve a much higher degree of elimination of organic pollutants than is possible in prior art systems. Such is achieved by the fact that in accordance with the present invention it is possible to dissolve a greater amount of oxygen in the waste water to be biologically purified, whereby during the biological filtering operation greater quantities of organic pollutants are biologically removed. It is further apparent that in accordance with the present invention the use of pure oxygen as the pressurizing gas is particularly desirable. Even further, it is possible in accordance with the present invention to automatically maximize the efficient use of the oxygen, to not only ensure that sufficient oxygen is dissolved to achieve a desired level of biological purification, but also to automatically ensure that excess oxygen is not wasted.

In accordance with the present invention, and due to the greater oxygen dissolving capabilities thereof, it is not necessary to recycle purified water to a position upstream of the biological filter. Therefore, in accordance with the present invention, as compared with the invention of U.S. Pat. No. 3,928,190, the rate of filtering is increased. The performance of the system is increased, both with regard to the amount of $BOD_5$ eliminated per liter of treated water, and also with regard to the amount of $BOD_5$ eliminated per cubic meter of filtering material.

Example

Tests performed on pilot plants have shown that by maintaining the pressure within the system at a level of only one bar above normal atmospheric pressure, it was easily possible to dissolve oxygen in urban waste water, which had previously been flocculated and decanted, in amounts of from 25 to 50 mg/l. The precise dissolution values at a given instance depended on conditions prevailing at the time, for example of atmospheric pressure, temperature of the water, salinity of the water, and pollution content of the water. The following table contains experimental results obtained from four different tests carried out on a pilot plant designed in accordance with the present invention wherein the biological From the above data, it will be apparent that, under the conditions of the experiments, in accordance with the present invention it is possible to eliminate from forty to more than sixty mg/l of $BOD_5$, and at filtering speeds exceeding 13 m/h, it is possible to achieve loads expressed in terms of eliminated pollution equal to or higher than 12 kg of $BOD_5$ per m³ per day, while still maintaining a very satisfactory physical filtering efficiency, as evidenced by the fact that the content of the suspended matter in the filtered or purified effluent does not in any case exceed 10 mg/l. Further, it will be apparent that the purification achieved in the above experiments corresponds favorably to those achieved and described in U.S. Pat. No. 3,928,190, since the consumption of oxygen in the filter varies between 0.45 and 0.76 mg per mg of eliminated $BOD_5$.

However, by increasing the pressure within the installation on the one hand, and by modifying the filtering speed and the height of the filtering material on the other hand, it is in fact possible for a device constructed in accordance with the invention, to achieve loads of from 10 to 15 kg of $BOD_5$ eliminated per m³/day on an average, with hourly peak values of 20 kg of $BOD_5$ per m³/day. The average filtering speed may then vary between 10 and 20 m/h, with peak hourly values of 25 to 30 m/h. These results can be obtained when the amount of pollution to be eliminated varies between 50 and 70 mg of $BOD_5$ per liter of water to be purified. It will be further apparent that other similar varying operating parameters are achievable and intended to be encompassed within the scope of the present invention.

It is specifically to be understood that the various individual elements illustrated and described above are not in and of themselves unique and may be any conventional and available such device which is capable of achieving the results described above. It is further to be understood that various other known elements of biological waste water treatment systems, which in and of themselves form no portion of the present invention, have not been illustrated or described, for purposes of simplicity. For example, the biological filtering bed 5 would in practice be equipped with a conventional backwashing system.

Furthermore, although the above illustration and description have been directed to specifically preferred embodiments of the process and apparatus of the present invention, it will be apparent that various modifications to such specifically described features may be made without departing from the scope of the present invention.

What we claim is:

1. A system for the continuous biological treatment of waste water, said system comprising:

an enclosed gas tight first chamber having positioned therein a biological filter bed, the interior of said first chamber being maintained at a pressure above atmospheric pressure;

means, separate from said first chamber, for superoxygenating waste water to be treated at a pressure equal to said pressure in said first chamber, said means comprising an enclosed gas tight second chamber, waste water supply means for introducing waste water to be treated, from a waste water source separate from said first chamber, into said second chamber, and oxygen supply means for introducing oxygen-containing gas into said second chamber such that oxygen of said gas is dissolved in said waste water in a quantity higher than the saturation concentration value of oxygen in the waste water at atmospheric pressure;

means for passing waste water which is superoxygenated in said second chamber into said first chamber at said pressure, said first chamber being free of any oxygen-containing gas inlets for supplying oxygen directly to water within said first chamber, whereby said waste water is biologically purified by passing through said biological filter bed, to thereby form purified water;

outlet duct means for withdrawing said purified water from said first chamber and for passing said purified water to a position of utilization separate from said means for superoxygenating waste water and from said waste water source;

means for measuring the residual dissolved oxygen content of said purified water; and means responsive to said measuring means for regulating said pressure and thus the amount of oxygen dissolved in said waste water to be treated.

2. A system as claimed in claim 1, wherein said oxygen supply means comprises means for dissolving oxygen in said waste water to be treated in amounts of from 30 to 100 mg/l.

3. A system as claimed in claim 1, wherein said measuring means comprises oxygen analyzer means operatively positioned for measuring the residual dissolved oxygen content of purified water passing through said outlet duct means and for detecting variations between the measured residual dissolved oxygen content and at least one predetermined residual dissolved oxygen content value, and wherein said regulating means comprises a pressure regulator operatively connected to said oxygen analyzer means and to said oxygen supply means for controlling the amount of gas introduced into said second chamber as a function of variations detected by said oxygen analyzer means, and for thereby controlling the amount of oxygen dissolved in said waste water to be treated in said second chamber, first liquid level detector means for detecting changes in the level of said waste water to be treated in said second chamber as a result of changes in the amount of gas supplied into said second chamber, and first valve means in said outlet duct means and operatively connected to said first liquid level detector means for relatively opening or closing said outlet duct means as a function of liquid level changes detected by said first liquid level detector means, thereby lowering or raising, respectively, said pressure within said first and second chambers.

4. A system as claimed in claim 3, further comprising second liquid level detector means, operatively connected to said waste water supply means, for detecting a predetermined maximum waste water level within said second chamber and for thereafter reducing or stopping the supply thereto of waste water, and third liquid level detector means, operatively connected to said oxygen supply means, for detecting a predetermined minimum waste water level within said second chamber and for thereafter reducing or stopping the supply thereto of said oxygen-containing gas.

5. A system as claimed in claim 1, wherein said second chamber is located within the interior of said first chamber, the interiors of said first and second chambers being completely isolated from each other except for said passing means.

6. A system as claimed in claim 1, wherein said oxygen supply means comprises means for introducing pure oxygen into said second chamber.

7. A process for the continuous biological treatment of waste water, said process comprising:

introducing waste water to be treated from a waste water source into an enclosed gas tight oxygenation chamber;

introducing oxygen-containing gas into said oxygenation chamber, at a pressure higher than atmospheric pressure, and therein dissolving oxygen of said gas in said waste water in a quantity higher than the saturation concentration value of oxygen in the waste water at atmospheric pressure, while maintaining said pressure within said oxygenation chamber, thereby superoxygenating said waste water;

passing the thus superoxygenated waste water into an enclosed gas tight filtering chamber, separate from said oxygenation chamber and from said waste water source, while maintaining the interior of said filtering chamber at said pressure, and while avoiding the introduction into the interior of said filtering chamber of any oxygen other than that dissolved in said waste water;

passing said superoxygenated waste water through a biological filter bed within said filtering chamber, thereby forming purified water;

removing said purified water from said filtering chamber, and passing said purified water to a position of utilization separate from said oxygenation chamber and from said waste water source;

measuring the residual dissolved oxygen content of said purified water; and regulating said pressure and thus the amount of oxygen dissolved in said waste water to be treated as a function of the measured residual dissolved oxygen content of said purified water.

8. A process as claimed in claim 7, wherein oxygen is dissolved in said waste water within said oxygenation chamber in amounts of from 30 to 100 mg/l.

9. A process as claimed in claim 7, further comprising detecting a predetermined maximum waste water level within said oxygenation chamber and thereafter reducing or stopping the supply thereto of waste water, and detecting a predetermined minimum waste water level within said oxygenation chamber and thereafter reducing or stopping the supply thereto of said oxygen-containing gas.

10. A process as claimed in claim 7, wherein said oxygen-containing gas comprises pure oxygen.

* * * * *